US008487035B2

(12) United States Patent
Akiyama et al.

(10) Patent No.: US 8,487,035 B2
(45) Date of Patent: Jul. 16, 2013

(54) RESIN COMPOSITION AND MOLDED PRODUCT THEREOF

(75) Inventors: Yoshikuni Akiyama, Tokyo (JP); Minoru Sakata, Tokyo (JP); Yukihiro Ban, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 279 days.

(21) Appl. No.: 12/294,287

(22) PCT Filed: Mar. 22, 2007

(86) PCT No.: PCT/JP2007/055804
§ 371 (c)(1),
(2), (4) Date: Sep. 24, 2008

(87) PCT Pub. No.: WO2007/114056
PCT Pub. Date: Oct. 11, 2007

(65) Prior Publication Data
US 2009/0253844 A1  Oct. 8, 2009

(30) Foreign Application Priority Data

Mar. 30, 2006 (JP) ................. 2006-095403
Oct. 26, 2006 (JP) ................. 2006-291444

(51) Int. Cl.
*C08K 3/04* (2006.01)
(52) U.S. Cl.
USPC .......................... 524/496; 524/495
(58) Field of Classification Search
USPC ................. 524/494–496
See application file for complete search history.

(56) References Cited

U.S. PATENT DOCUMENTS

| | | | |
|---|---|---|---|
| 2,513,188 | A | 6/1950 | Macallum |
| 3,257,357 | A | 6/1966 | Stamatoff |
| 3,257,358 | A | 6/1966 | Stamatoff |
| 3,274,165 | A | 9/1966 | Lenz et al. |
| 3,306,874 | A | 2/1967 | Hay |
| 3,306,875 | A | 2/1967 | Hay |
| 3,929,930 | A | 12/1975 | Izawa et al. |
| 5,093,035 | A | 3/1992 | Dziurla et al. |
| 5,342,920 | A | 8/1994 | Imai et al. |
| 550,471 | A | 3/1996 | Uota |

FOREIGN PATENT DOCUMENTS

| | | |
|---|---|---|
| EP | 0 747 909 | 12/1996 |
| EP | 8-333474 | 12/1996 |
| EP | 0 953 606 | 11/1999 |
| JP | 44-27671 | 11/1969 |
| JP | 45-3368 | 2/1970 |
| JP | 46-27255 | 8/1971 |
| JP | 50-51197 | 5/1975 |
| JP | 52-12240 | 4/1977 |
| JP | 52-17880 | 5/1977 |
| JP | 61-225217 | 10/1986 |
| JP | 63-152628 | 6/1988 |
| JP | 64-17277 | 1/1989 |
| JP | 1-254766 | 10/1989 |
| JP | 1-272665 | 10/1989 |
| JP | 5-222196 | 8/1993 |
| JP | 5-230370 | 9/1993 |
| JP | 5-247351 | 9/1993 |
| JP | 7-286103 | 10/1995 |
| JP | 10-158511 | 6/1998 |
| JP | 2000-281885 | 10/2000 |
| JP | 2004-146258 | 5/2004 |
| JP | 2004146258 A * | 5/2004 |
| JP | 2005-105024 | 4/2005 |
| JP | 2005105024 A * | 4/2005 |
| JP | 2006-69046 | 3/2006 |
| JP | 2006-291076 | 10/2006 |

OTHER PUBLICATIONS

Showa Denko K.K. Product Description: Ultra-Fine Artificial Graphite Powder.*
English language Abstract of JP 2004-146258.
English language Abstract of JP 2006-291076.
English language Abstract of JP 2005-105024.
English language Abstract of JP 64-17277.
English language Abstract of JP 1-254766.
English language Abstract of JP 5-247351.
English language Abstract of JP 7-286103.
English language Abstract of JP 2000-281885.
English language Abstract of JP 2006-69046.
English language Abstract of JP 44-27671.
English language Abstract of JP 61-225217.
English language Abstract of JP 5-222196.
English language Abstract of JP 63-152628.
English language Abstract of EP 0 747 909.

* cited by examiner

*Primary Examiner* — Peter Szekely
(74) *Attorney, Agent, or Firm* — Greenblum & Bernstein, P.L.C.

(57) ABSTRACT

An object of the present invention is to provide a resin composition in which a surface resistivity and a volume resistivity actually measured in an antistatic region and an electrostatic diffusion region are equivalent to each other, and a remolded product produced by reutilizing a molded product which can hold the above properties. Specifically, disclosed is a resin composition comprising: 100 parts by weight of (a) a thermoplastic resin; 20 to 80 parts by weight of (b) a nonconductive fibrous inorganic filler having an average fiber diameter of not more than 15 μm; and 10 to 70 parts by weight of the total of (c1) a graphite and (c2) a graphite in which (c) graphite having an average particle diameter of 1 μm to 50 μm wherein each kind thereof has a different particle diameter; and at least one of differences in average particle diameter between two kinds thereof is not less than 5 μm.

14 Claims, 2 Drawing Sheets

RESIN COMPOSITION AND MOLDED PRODUCT THEREOF

TECHNICAL FIELD

The present invention relates to a resin composition excellent in static dissipativity and antistaticity of plastic members used as household appliance parts, electronic and electric parts, OA device parts, audio and imaging device parts and automobile parts, and molded products thereof.

BACKGROUND ART

Thermoplastic resins are variously utilized as molding materials for household appliance parts, electronic and electric parts, OA device parts, audio and imaging device parts and automobile parts.

Many of such thermoplastic resins accumulate static electricity because they are electric insulating materials. The accumulation of static electricity leads to dust adhesion and electrostatic discharge. The accumulation further causes very serious trouble such as breakage of ICs, transistors, circuit substrates and the like, which are vulnerable to static electricity.

Therefore, many modifications and ingenuities have been proposed such as imparting antistaticity to thermoplastic resin compositions having electric insulation by formulating them with conductive substances.

Conductivity-imparted noninsulating resin compositions have largely different performances depending on electric resistivities thereof. The compositions are generally classified as follows by range of the surface resistivity.

(1) A conductive resin composition, which has a surface resistivity of less than $1\times10^5$ Ω/sq., and which causes severe static discharge in contact with a charged object, and exhibits a high conductivity (a low resistivity).

(2) A static dissipative resin composition, which has a surface resistivity of from $1\times10^5$ to $1\times10^9$ Ω/sq., which does not cause severe static discharge in contact with a charged object, and exhibits a conductivity dissipating the charge promptly, and which does not have a conductivity enough to shield the static field.

(3) An antistatic resin composition, which has a surface resistivity of from $1\times10^9$ to $1\times10^{14}$ Ω/sq., and which has a conductivity capable of preventing the charging of itself to some degree, but does not have a conductivity enough to dissipate promptly static electricity of a charged object.

Documents describe techniques to impart conductivity to various types of thermoplastic resins by formulating the resins with various types of conductive materials. For example, proposed are a resin composition in which conductive carbon black, natural scaly graphite and an inorganic filler are formulated in a polyphenylene sulfide (for example, see Patent Document 1), a resin composition in which conductive carbon black, graphite and a filler are formulated in a polyphenylene sulfide resin (for example, see Patent Document 2), a resin composition in which carbon fiber, graphite, a silane-based coupling agent and an epoxy resin are formulated in polyarylene sulfide, (for example, see Patent Document 3), a resin composition in which zinc oxide whisker and the like are formulated in a thermoplastic resin (for example, see Patent Document 4), a resin composition in which conductive carbon black and artificial graphite are formulated in a thermoplastic resin (for example, Patent Document 5), a resin composition in which conductive carbon black, graphite and an epoxy group-containing α-olefinic copolymer are formulated in a polyarylene sulfide (for example, see Patent Document 6), a resin composition in which graphite is formulated in a liquid crystal polyester (for example, see Patent Document 7), a resin composition of a semiconductive film in which a conductive filler is formulated in a polyphenylene sulfide (for example, see Patent Document 8), and a resin for a coil encapsulating material (see Patent Document 9).

The noninsulating resin compositions having three electric characteristics described above are suitably selectively used from the range of the surface resistivity according to purposes and applications. Therefore, control of the electric resistivity is important in the technique to impart conductivity to resin compositions.

Especially the static dissipative resin composition and the antistatic resin composition have a largely different surface resistance value and volume resistance value of molded products. The reason is because the surface resistance value becomes less by receiving an influence of leak current to the thickness direction of molded products. However, for plastic members, noninsulating resin compositions are desired which have a stable actually measured surface resistance value and volume resistance value, both of which are nearly equivalent to each other. For obtaining such resin compositions, the techniques described above do not work enough.

Further, remolded products obtained by reutilizing molded products, runner sections, spool sections and the like at molding have a largely varied surface resistivities and a largely different surface resistance value and volume resistance value. For improving this point, the techniques described above do not work enough.

Patent Document 1: Japanese Patent Application No. 62-172059

Patent Document 2: Japanese Patent Laid-Open No. 1-272665

Patent Document 3: Japanese Patent Laid-Open No. 1-254766

Patent Document 4: Japanese Patent Laid-Open No. 5-247351

Patent Document 5: Japanese Patent Laid-Open No. 7-286103

Patent Document 6: Japanese Patent Laid-Open No. 10-158511

Patent Document 7: Japanese Patent Laid-Open No. 2000-281885

Patent Document 8: Japanese Patent Laid-Open No. 2006-69046

Patent Document 9: Japanese Patent Laid-Open No. 2006-291076

DISCLOSURE OF INVENTION

Problems to be Solved by the Invention

An object to be solved by the present invention is to provide an antistatic resin composition and a static dissipative resin composition which have a stable surface resistance value and volume resistance value, both of which are equivalent to each other, and have little variation in the surface resistivity. Further, with respect to remolded products obtained by reutilizing the molded products, an antistatic resin composition and a static dissipative resin composition which have a stable surface resistance value and volume resistance value, both of which are equivalent to each other, and have little variation in the surface resistivity, can be provided.

Means for Solving the Problems

The present inventors have exhaustively studied, to solve the problems described above, an antistatic resin composition and a static dissipative resin composition in which conductive materials are formulated in a thermoplastic resin. As a result, the present inventors have found that a resin composition in which a nonconductive fibrous inorganic filler and two or more kinds of graphite having different average particle diameters are concurrently used exhibits a stable noninsulating property, and further that remolded products obtained by reutilizing the molded products exhibit a similar noninsulating property. This has led to the present invention.

That is, the present invention is as follows.

(1) A resin composition comprising:
   100 parts by weight of (a) a thermoplastic resin;
   20 to 80 parts by weight of (b) a nonconductive fibrous inorganic filler having an average fiber diameter of not more than 15 μm; and
   10 to 70 parts by weight of the total of at least two kinds of (c) graphite having an average particle diameter of 1 μm to 50 μm wherein each kind thereof has a different particle diameter; and at least one of differences in average particle diameter between two kinds thereof is not less than 5 μm.
(2) The resin composition according to item (1), wherein the (a) component is a thermoplastic resin which is a crystalline resin and/or a noncrystalline resin.
(3) The resin composition according to item (2), wherein the crystalline resin is any one of a polyolefin, a syndiotactic polystyrene, a polyacetal, a polyamide, a polyester, a polyphenylene sulfide, a polyether ether ketone, a liquid crystal polymer and a fluororesin; and the noncrystalline resin is any one of a styrene resin, a polycarbonate, a polyphenylene ether, a polysulfone, a polyether sulfone, a polyarylate, a polyamide-imide and a polyether imide.
(4) The resin composition according to item (3), wherein the (a) component is any one of a polyphenylene ether, a polyphenylene sulfide and a liquid crystal polymer.
(5) The resin composition according to item (3), wherein the (a) component is any one of polymer alloys of a polyphenylene ether, and a polyphenylene sulfide, a styrene resin, a polyolefin, a polyamide, a polyester or a liquid crystal polymer.
(6) The resin composition according to any one of items (1) to (5), wherein the nonconductive fibrous inorganic filler of the (b) component is at least one specie selected from the group consisting of a glass fiber, an alumina fiber, a ceramic fiber, a gypsum fiber, a potassium titanate whisker, a magnesium sulfate whisker, a zinc oxide whisker, a calcium carbonate whisker, a calcium silicate whisker and a wallastonite.
(7) The resin composition according to any one of items (1) to (6), wherein the nonconductive fibrous inorganic filler of the (b) component is a glass fiber.
(8) The resin composition according to item (7), wherein the nonconductive fibrous inorganic filler of the (b) component is a glass fiber having an average fiber diameter of from 4 μm to 10 μm.
(9) The resin composition according to any one of items (1) to (8,) wherein the two kinds of the (c) graphite are (c1) a graphite having an average particle diameter of from 15 μm to 50 μm and (c2) a graphite having an average particle diameter of from 1 μm to 10 μm.
(10) The resin composition according to item (9), wherein (an average particle diameter of the (c1) component)/(an average particle diameter of the (c2) component) is from 3 to 10.
(11) The resin composition according to item (10), wherein (a formulation amount of the (c1) component)/(a formulation amount of the (c2) component) is from 0.1 to 1.0.
(12) The resin composition according to any one of items (1) to (11), wherein the resin composition has a surface resistivity of from $1 \times 10^5$ Ω/sq. to $1 \times 10^{14}$ Ω/sq.
(13) The resin composition according to any one of items (1) to (12), wherein the resin composition has an anisotropy of a resistance value of from 0.3 to 1.5.
(14) A molded product molded using the resin composition according to any one of items (1) to (13).
(15) A remolded product obtained by reutilizing a molded product molded using the resin composition according to item (14).
(16) A resin composition obtained by melt-kneading 100 parts by weight of (a) a thermoplastic resin; 20 parts by weight to 80 parts by weight of (b) a nonconductive fibrous inorganic filler having an average fiber diameter of not more than 15 μm; and 10 parts by weight to 70 parts by weight of the total of two kinds of (c) graphite having an average particle diameter of from 1 μm to 50 μm wherein each kind thereof has a different particle diameter, and a difference in average particle diameter between the two kinds thereof is not less than 5 μm.

Advantageous Effects of the Invention

The antistatic resin composition and the static dissipative resin composition obtained in the present invention have little variation in surface resistivity and a stable surface resistance value and volume resistance value which are actually measured, both of which are equivalent to each other. Therefore, molded products thereof have little variation in surface resistivity and a stable surface resistance value and volume resistance value which are actually measured, both of which are equivalent to each other. Further, remolded products obtained by reutilizing the molded products also have a similar noninsulating property, which is very useful industrially.

DESCRIPTION OF SYMBOLS

Figure 1:
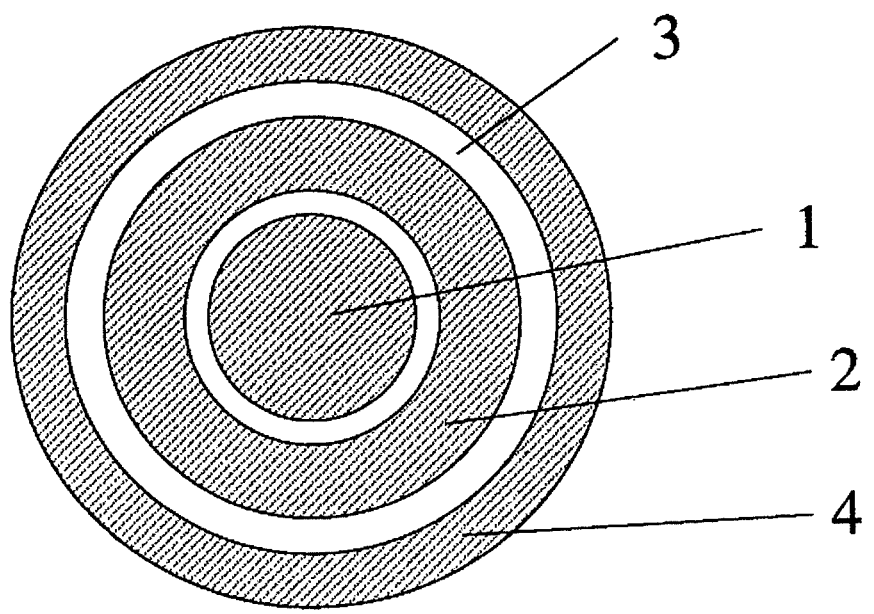
FIG. 1 is a diagram viewed from the above of a resistance measurement apparatus used in the present invention.
Figure 2:
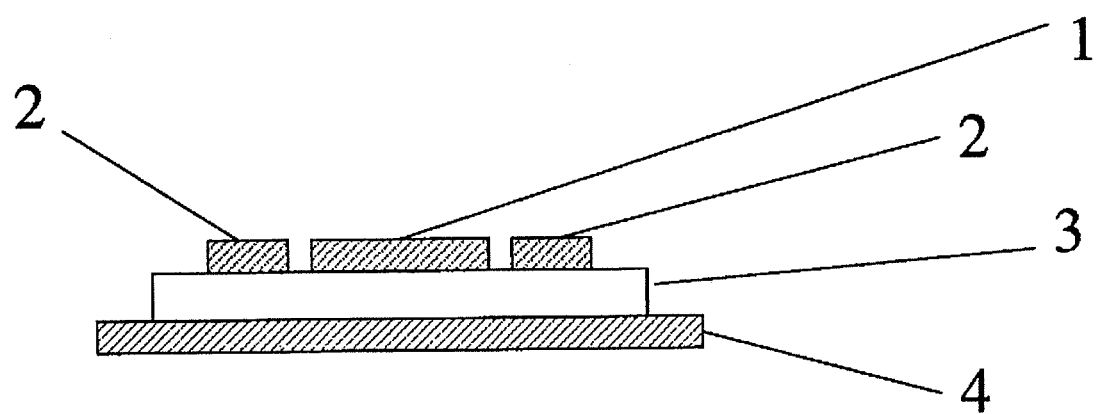
FIG. 2 is a sectional diagram viewed laterally of the resistance measurement apparatus used in the present invention.

1 Main electrode
2 Guard electrode
3 Sample (molded product)
4 Counter electrode

BEST MODE FOR CARRYING OUT THE INVENTION

Hereinafter, the present invention will be described in detail.

A thermoplastic resin of (a) a component is classified as a crystalline resin and a noncrystalline resin.

The crystalline resin is a resin having a crystal peak present in measurement by DSC (differential scanning calorimetric analyzer). By contrast, the noncrystalline resin is a resin having no crystal peak present in measurement by DSC.

As (a) the thermoplastic resins, one or more kinds thereof are selected from either one of the crystalline resins and the noncrystalline resins. Or, a combination of one or more kinds of crystalline resins and one or more kinds of noncrystalline resins is selected. Specific examples of the combination may include a crystalline resin/a crystalline resin, a crystalline resin/a noncrystalline resin and a noncrystalline resin/a noncrystalline resin. Their combined formulation ratio (weight percent) is preferably from 99/1 to 1/99. The formulation ratio can be altered according to levels of desired heat resistance, solvent resistance and the like.

Examples of the crystalline resins may include polyolefins, oxymethylene copolymers, polyamides, polyesters, polyphenylene sulfides, polyether ether ketones, liquid crystal polymers, syndiotactic polystyrenes, polyacetals and fluororesins.

Examples of the noncrystalline resins may include styrene resins, polyphenylene ethers, polycarbonates, polysulfones, polyether sulfones, polyarylates, polyamide-imides and polyether imides.

Resins suitably used among the crystalline resins may include polyolefins, polyamides, polyesters, polyphenylene sulfides, liquid crystal polymers, syndiotactic polystyrenes, polyacetals and the like.

Polyolefins may include isotactic polypropylenes, poly(4-methyl-1-pentene), polybutene-1, high-density polyethylenes, ultrahigh-molecular-weight high-density polyethylenes, low-density polyethylenes, linear low-density polyethylenes, ultralow-density polyethylenes of less than 0.90 in density, and copolymers of two or more kinds of compounds selected from ethylene, propylene and other α-olefins, such as ethylene/propylene copolymers, ethylene/butene-1-copolymers, ethylene/octene copolymers, propylene/ethylene (random, block) copolymers, propylene/1-hexene copolymers, propylene/4-methyl-1-pentene copolymers and the like.

Polyamides may include polyamide 6, polyamide 66, polyamide 46, polyamide 11, polyamide 12, polyamide 610, polyamide 612, polyamide 6/66, polyamide 6/612, polyamide MXD (m-xylylenediamine)/6, polyamide 6T, polyamide 6I, polyamide 6/6T, polyamide 6/6I, polyamide 66/6T, polyamide 66/6I, polyamide 6/6T/6I, polyamide 66/6T/6I, polyamide 6/12/6T, polyamide 66/12/6T, polyamide 6/12/6I, polyamide 66/12/6I, poly(paraphenylene terephthalamide), poly(parabenzamide), poly(4,4'-benzanilide terephthalamide), poly(paraphenylene-4,4'-biphenylenedicarboxylic acid amide), poly(paraphenylene-2,6-naphthalenedicarboxylic acid amide), poly(2-chloroparaphenylene terephthalamide), paraphenylenediamine/2,6-dichloroparaphenylenediamine/terephthalic acid dichloride copolymers, polynonamethylene terephthalamide (9T nylon) and the like.

Polyesters may include polyethylene terephthalates, polytrimethylene terephthalates, polybutylene terephthalates and the like. Above all, polytrimethylene terephthalates and polybutylene terephthalates are preferable.

Polyphenylene sulfides (hereinafter, abbreviated as PPS) contain a repeating unit of arylene sulfide represented by the general formula (Formula 1) described below. The content of the repeating unit is preferably 50 mol %, more preferably 70 mol %, still more preferably 90 mol %.

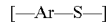 (Formula 1)

(wherein Ar represents an arylene group.)

The arylene groups may include, for example, a p-phenylene group, an m-phenylene group, a substituted phenylene group (as a substituent, an alkyl group having 1 to 10 carbon atoms or a phenyl group is preferable), a p,p'-biphenylene sulfone group, a p,p'-biphenylene group, a p,p'-diphenylene carbonyl group and a naphthylene group.

PPS may be a homopolymer having one specie of the arylene group. It may be a copolymer having two or more different species of arylene groups in view of the processability and heat resistance. As the arylene group, linear polyphenylene sulfides having a p-phenylene group are preferable in view of excellent processability and heat resistance, and easy industrial availability.

Manufacturing methods of the PPS may include the following ones:
(1) a method in which a halogen-substituted aromatic compound, for example, p-dichlorobenzene, is polymerized in the presence of sulfur and sodium carbonate;
(2) a method in which the polymerization is performed in a polar solvent in the presence of any one of sodium sulfide, sodium hydrogensulfide and hydrogen sulfide, and sodium hydroxide, or in the presence of hydrogen sulfide and sodium aminoalkanoate; and
(3) condensation of sodium sulfide and p-dichlorobenzene, and self-condensation of p-chlorothiophenol.

Above all, a method is suitable in which sodium sulfide and p-dichlorobenzene are reacted in an amide solvent such as N-methylpyrrolidone or dimethylacetamide, or a sulfone solvent such as sulfolane. These manufacturing methods are publicly known. PPS can be obtained, for example, by methods described in U.S. Pat. No. 2,513,188, Japanese Patent Publication Nos. 44-27671, 45-3368 and 52-12240, Japanese Patent Laid-Open No. 61-225217, U.S. Pat. No. 3,274,165, Japanese Patent Publication No. 46-27255, Belgian Patent No. 29437, and Japanese Patent Laid-Open No. 5-222196, and methods of prior arts exemplified in these patent documents.

PPS polymerized by the method described above may be oxidatively crosslinked by heat treatment in the presence of oxygen at a temperature of not more than the melting point of PPS. This method can provide a crosslinked PPS whose polymer molecular weight and viscosity are reasonably raised. This crosslinked PPS can also be suitably used in the present invention.

A linear PPS and a crosslinked PPS may be concurrently used in an optional proportion.

Here, the oligomer amount contained in PPS can be determined by the following extraction with methylene chloride.
(1) 5 g of PPS powder is added to 80 ml of methylene chloride, and subjected to Soxhlet extraction for 6 hours.
(2) The solution after the Soxhlet extraction is transferred to a weighing bottle.
(3) The vessel used in the extraction is washed separately three times using 60 ml of the total of methylene chloride and the washing liquid is recovered in the weighing bottle.
(4) The weighing bottle is heated at about 80° C. to evaporate and remove methylene chloride in the weighing bottle, and the residue is weighed.

The residue amount corresponds to an extraction amount with methylene chloride, that is, the amount of oligomer present in PPS.

The amount of —SX group of PPS(S represents a sulfur atom, and X represents an alkaline metal or a hydrogen atom.) can be quantitatively determined by the following method.
(1) 20 g of PPS powder dried at 120° C. for 4 hours is added to 150 g of N-methyl-2-pyrrolidone to obtain a slurry. At this time, the mixture is vigorously stirred and mixed at room temperature for 30 min so that the powder agglomerate disappears.
(2) The slurry is filtered and washed seven times using 1 L of warm water of about 80° C. in every time.
(3) The filter cake obtained in (2) is mixed with 200 g of pure water to again obtain a slurry. Then, 1N hydrochloric acid is added to the slurry to adjust the pH of the slurry at 4.5.
(4) The slurry is stirred at 25° C. for 30 min, and then filtered, and washed six times using 1 L of warm water of about 80° C. in every time.

(5) The filter cake obtained in (4) is again mixed with 200 g of pure water to obtain a slurry. Then, the slurry is subjected to titration with 1N sodium hydroxide.

The amount of —SX group present in PPS can be determined by the consumed amount of sodium hydroxide.

As the liquid crystal polymer, publicly known polyesters called thermotropic liquid crystal polymers can be used. Example of the liquid crystal polymer may include thermotropic liquid crystal polyesters composed of p-hydroxybenzoic acid and a polyethylene terephthalate as main constituting units, thermotropic liquid crystal polyesters composed of p-hydroxybenzoic acid and 2-hydroxy-naphthoic acid as main constituting units, and thermotropic liquid crystal polyesters composed of p-hydroxybenzoic acid, 4,4'-dihydroxybiphenyl and terephthalic acid as main constituting units, and are not especially limited.

The noncrystalline resins may preferably include styrene resins and polyphenylene ethers.

The styrene resins may include atactic polystyrenes, rubber-reinforced polystyrenes (HIPS), styrene-acrylonitrile copolymers (AS) having a styrene content of not less than 50% by weight, and rubber-reinforced AS resins.

The polyphenylene ether (PPE) is composed of a bonding unit described below.

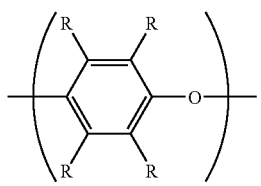

[Formula 1]

(wherein O represents an oxygen atom; and R represents a group selected from the group consisting of hydrogen, halogen, a primary or secondary alkyl group having 1 to 7 carbon atoms, a phenyl group, a haloalkyl group, an aminoalkyl group, a hydrocarbonoxy group, and a halohydrocarbonoxy group in which at least two carbon atoms separate a halogen atom and an oxygen atom, and may be the same or different in the same bonding unit.)

The reduced viscosity of PPE (chloroform solution of 0.5 g/dl thereof, measured at 30° C.) is preferably in a range of from 0.15 to 2, more preferably in the range of from 0.2 to 1. PPE may be a homopolymer, a copolymer or their mixture.

Specific examples of PPE may include polyphenylene ether copolymers such as poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether); and also copolymers of 2,6-dimethylphenol and another phenol (for example, 2,3,6-trimethylphenol and 2-methyl-6-butylphenol). Above all, a poly(2,6-dimethyl-1,4-phenylene ether), and a copolymer of 2,6-dimethylphenol and 2,3,6-trimethylphenol are preferable, and especially a poly(2,6-dimethyl-1,4-phenylene ether) is preferable.

Manufacturing methods of the PPE are not especially limited as long as they are publicly known ones. PPE can be easily manufactured, for example, by a method by Hay described in U.S. Pat. No. 3,306,874 in which 2,6-xylenol and the like are subjected to oxidative polymerization using as a catalyst a complex of a cuprous salt and an amine. Besides, PPE can be easily manufactured by methods described in U.S. Pat. Nos. 3,306,875, 3,257,357 and 3,257,358, Japanese Patent Publication No. 52-17880, Japanese Patent Laid-Open Nos. 50-51197 and 63-152628, and the like.

In the case of combining two or more different kinds of resins as (a) thermoplastic resins, the combination may be a polymer alloy obtained by subjecting them to heat melt mixing or solution mixing.

Preferable polymer alloys are those of PPE, and PPS, a styrene resin, a polyolefin, a polyamide, a polyester or a liquid crystal polymer, but are not limited thereto.

In the case of using a polymer alloy, an admixture may be formulated in addition to different two or more kinds of resins. For example, in the case of a polymer alloy of PPS/PPE, an epoxy resin, a silane coupling agent, a styrene-glycidyl methacrylate copolymer, a copolymer of styrene and 2-isopropenyl-2-oxazoline, a styrene-maleic anhydride copolymer and a polyisocyanate compound can be used as an admixture.

In the case of a polymer alloy of polyolefin/PPE, a hydrogenated block copolymer, and a block copolymer or a graft copolymer having a polyolefin chain-polystyrene chain can be used as an admixture.

In the case of a polymer alloy of polyamide/PPE, a styrene-maleic anhydride copolymer, a styrene-glycidyl methacrylate copolymer, a copolymer of styrene and 2-isopropenyl-2-oxazoline, and a maleic anhydride-grafted PPE can be used as an admixture.

In the case of a polymer alloy of polyester/PPE, a styrene-glycidyl methacrylate copolymer, a copolymer of styrene and 2-isopropenyl-2-oxazoline, and a polyisocyanate compound can be used as an admixture.

The polyisocyanate compound as an admixture may include 2,4-toluylene diisocyanate, 2,6-toluylene diisocyanate, 4,4'-diphenylmethane diisocyanate, 3,3'-dimethylbiphenyl-4,4'-diisocyanate, isophorone diisocyanate, hexamethylene diisocyanate and polymethylene polyphenylene polyisocyanates.

(b) Nonconductive fibrous inorganic filler refers to an inorganic filler which is nonconductive and fibrous. (b) Nonconductive fibrous inorganic filler has an average fiber diameter of not more than 15 μm. Publicly known inorganic filers satisfying the above condition can be used. The diameter is not more than 15 μm for providing a stable surface resistance value and volume resistance value, both of which are equivalent to each other, of the antistatic region and the static dissipative region. The diameter is preferably not less than 1 μm in view of its easy availability.

Specifically, the fillers include glass fibers (continuous glass fibers and chopped strand glass fibers), alumina fibers, ceramic fibers, gypsum fibers, potassium titanate whiskers, magnesium sulfate whiskers, zinc oxide whiskers, calcium carbonate whiskers, calcium silicate whiskers, wallastonite and the like. Above all, glass fibers are preferable and glass fibers having an average fiber diameter of from 4 to 10 μm are most preferable.

The fiber diameter is measured by the following method.

(1) A glass chopped strand and a resin composition are put in a crucible, and burned in an electric furnace of 550° C. for 2 hours.

(2) The resin component and the remaining inorganic filler are separated; the glass fibers in the remaining inorganic filler are photographed by a microscope; and the diameters of 100 glass fibers are measured on the photograph.

In the present application, the average of the 100 glass fibers is defined as an average fiber diameter.

Further, inorganic fillers may be used which have been subjected to surface treatment with a silane-based coupling agent, a titanate-based coupling agent, an aliphatic metal salt or the like, which have been subjected to organization treatment by the intercalation method using ammonium salt or the like, or in which a resin such as a urethane resin or an epoxy resin is used as a binder.

Graphite of the (c) component of the present invention has an average particle diameter of from 1 to 50 μm. (c) Graphite is either of an artificial graphite and a natural graphite having a fixed carbon of not less than 90%. Preferable shapes are scaly and flaky. The average particle diameter can be measured by the screening analysis or a laser diffraction type particle size distribution measuring apparatus according to "Methods for industrial analysis and testing of natural graphite" of JIS M8511. In the present invention, a laser diffraction type particle size distribution measuring apparatus was used.

The diameter is not more than 50 μm for providing a stable surface resistance value and volume resistance value, both of which are equivalent to each other, of the antistatic region and the static dissipative region. The diameter is preferably not less than 1 μm in view of its conductivity.

Graphite of the (c) component having an average particle diameter of from 1 to 50 μm can be obtained by crushing the natural graphite or the artificial graphite by a mechanical crushing method using a crusher, for example, a grain mill, a Victory mill, a stamp mill, a ball mill, a jet mill or a high-speed rotation mill. The graphite obtained by the method may be subjected to surface treatment of the graphite surface with a silane-based coupling agent, a titanate-based coupling agent, a metal salt of an aliphatic compound or the like, or may be subjected to organization treatment by the intercalation method using an ammonium salt or the like, or may use a resin such as a urethane resin or an epoxy resin as a binder, for further enhancing an effect on its dispersion in a resin.

In the present invention, two kinds of (c) graphite are used which have different average particle diameters, and have a difference in average particle diameter of not less than 5 μm. As long as two kinds of (c) graphite are contained which have different average particle diameters, and have a difference in average particle diameter of not less than 5 μm, two or more kinds thereof may be used.

In the case of using two kinds of (c) graphite having different average particle diameters, graphite having a larger average particle diameter is defined as (c1) graphite; and graphite having a smaller one is defined as (c2) graphite. The difference in average particle diameter between the (c1) graphite and the (c2) graphite is not less than 5 μm.

Concurrent use of (c) graphite concurrently containing (c1) graphite and (c2) graphite, and (b) nonconductive fibrous inorganic filler described above having an average particle diameter of not more than 15 μm, results in a stable surface resistance value and volume resistance value, both of which are equivalent to each other, of the antistatic region and the static dissipative region. Further, remolded products obtained reutilizing molded products exhibit also a similar noninsulating property.

A more preferable mode when (c1) graphite and (c2) graphite are concurrently used is as follows.
(1) The (c1) graphite has an average particle diameter of from 15 to 50 μm; and the (c2) graphite has that of from 1 to 10 μm.
(2) The ratio of the average particle diameters ((the average particle diameter of the (c1) graphite)/(the average particle diameter of the (c2) graphite)) is from 3 to 10.
(3) The weight ratio of the formulation amounts ((the formulation amount of the (c1) graphite)/(the formulation amount of the (c2) graphite)) is from 0.1 to 1.

The formulation amounts of the components of the resin composition according to the present invention include 100 parts by weight of (a) component; 20 to 80 parts by weight of (b) component; and 10 to 70 parts by weight of (c) component. The formulation amount of the (c) component is the total of two kinds of the (c) graphite having different average particle diameters and a difference in average particle diameter of not less than 5 μm. This formulation can provide a stable antistatic resin composition and static dissipative resin composition exhibiting little variation in surface resistivity and having the equivalence of an actually measured surface resistance value and volume resistance value. The molded product thereof also has little variation in surface resistivity and a stable actually measured surface resistance value and volume resistance value, both of which are equivalent to each other. Further, remolded products obtained by reutilizing the molded products exhibit also a similar noninsulating property. Further, the impact resistance and the mechanical properties are excellent. Formulation of not less than 20 parts by weight of (b) component and not less than 10 parts by weight of (c) component exhibits an effect of the concurrent use of the (b) component and the (c) component. Specifically, the surface resistance value and the volume resistance value of the obtained antistatic resin composition and static dissipative resin composition are stable, and are equivalent to each other. On the other hand, formulation of not more than 80 parts by weight of the (b) component and not more than 70 parts by weight of the (c) component can provide a resin composition for making molded products which are reutilized for obtaining remolded products exhibiting a similar noninsulating property.

The resistance value and the resistivity in the present invention were measured by the double ring probe method according to JIS K6911.

The resistance measuring apparatus used in the present invention has a disk-like main electrode having a diameter of 19.6 mm and a ring-shaped electrode having an inner diameter of 24.1 mm and an outer diameter of 28.8 mm concentrically outside the main electrode. The measurement of surface resistance is conducted by placing a molded product over both the disk-like main electrode and the ring-shaped guard electrode and measuring a resistance value of the molded product generated on the surface contacting with both the electrodes. The surface resistivity is a value of a product of the surface resistance value thus obtained and an electrode constant.

A preferable surface resistivity of the resin composition is from $1 \times 10^5$ to $1 \times 10^{14}$ Ω/sq.

The measurement of the volume resistance is conducted by measuring a resistance value of the molded product generated between the disk-like main electrode and a metal surface (counter electrode) contacting with the surface of the opposite side of the contact surface with the main electrode of the molded product. The volume resistivity is a value obtained by dividing a product of the volume resistance value thus obtained and an electrode constant by the thickness of the molded product.

Whether the surface resistance value and the volume resistance value are equivalent to each other is judged by a value obtained by dividing a surface resistance value (Rs) by a volume resistance value (Rv). This value is defined as an anisotropy (A).

$$A = Rs/Rv$$

The case of A=1 means "the surface resistance value=the volume resistance value" and no anisotropy between both the resistance values.

The anisotropy (A) of the resin composition is preferably from 0.3 to 1.5 practically. It is more preferably from 0.4 to 1.4, still more preferably from 0.4 to 1.2. For making the anisotropy (A) of the resistance values in these ranges, a composition obtained by combining the (b) component and the (c) component described above must be made.

The stability (S) of the resin composition is judged by the calculating expression described below.

$$S=(\log R\text{smax})-(\log R\text{smin})$$

(Rsmax: a maximum value of surface resistance values measured at a plurality of points; and Rsmin: a minimum value of the surface resistance values measured at the plurality of points)

The S described above of about not more than 3 is preferable in view of the stability of the resistance value.

In the present invention, in addition to the components described above, another thermoplastic elastomer (a hydrogenated block copolymer and polyolefin elastomer), a stabilizer such as a thermal stabilizer, an antioxidant or an ultraviolet absorbent, a crystal nucleating agent, a flame retardant, and a publicly known releasing agent such as a lubricant oil, a polyethylene wax, a polypropylene wax, a montanic salt wax or a stearic salt wax, can be suitably added as needed in the range where the feature and the effect of the present invention are not damaged.

The resin composition according to the present invention can be manufactured by melting and kneading the components described above by using a heat-melting and kneading machine such as a single screw extruder, a twin screw extruder, a roll, a kneader, a Brabender Plastograph or a Banbury mixer. Above all, the manufacturing method of melting and kneading by using a twin screw extruder is preferable.

The melting and kneading temperature is preferably selected such that a crystalline resin is heat-melted and can unforcibly be processed at a temperature of not less than its melting temperature; and a noncrystalline resin is at a temperature of not less than its glass transition temperature. The temperature is commonly in the range of from 200 to 370° C.

The screw rotation frequency is preferably from 100 to 1,200 rpm, more preferably from 200 to 500 rpm.

A specific manufacturing method of the resin composition according to the present invention by a twin screw extruder is preferably a method described below.

(1) A thermoplastic resin of (a) component is supplied to a first supply port of a twin screw extruder, and melted and kneaded with the temperature of a heat melt zone set at the melting temperature thereof.

(2) In a state that the (a) component is being melted and kneaded, a nonconductive fibrous inorganic filler of (b) component and a graphite of (c) component are supplied to a second supply port of the extruder, and the mixture is further melted and kneaded.

With respect to the positions where the (b) component and the (c) component are supplied, they may be collectively supplied to the second supply port of the extruder as described above, or the (b) component and the (c) component may be separately supplied to the second supply port and an installed third supply port.

An antistatic resin composition and a static dissipative resin composition are thus obtained. The compositions have the stable surface resistance value and volume resistance value, both of which are equivalent to each other. Further, remolded products obtained reutilizing molded products thereof have a similar noninsulating property. The molding methods may include, for example, injection molding, metal-in molding, outsert molding, hollow molding, extrusion molding, sheet molding, heat press molding, rotation molding and lamination molding.

EXAMPLES

Hereinafter, the present invention will be described by way of Examples.

1. Raw Materials

Raw materials used were as follows.

(1) Polyphenylene Sulfide
PPS-1: a linear PPS
  Melt viscosity: 50 Pa·s
  Oligomer amount: 0.4% by weight
  —SX group amount: 29 μmol/g
PPS-2: a crosslinked PPS
  Melt viscosity: 60 Pa·s
  Extraction amount with methylene chloride: 0.7% by weight (2) Polyphenylene Ether
PPE-1: PPE having a reduced viscosity of 0.53 dl/g
PPE-2: PPE having a reduced viscosity of 0.52 dl/g
PPE-3: PPE having a reduced viscosity of 0.31 dl/g
PPE-4: PPE having a reduced viscosity of 0.42 dl/g (3) High-impact Polystyrene
HIPS: H0103, made by Japan Polystyrene Inc.

(4) Polypropylene
PP: melting point of 167° C., MFR=4.6 (g/10 min)

(5) Polyamide
PA: Nylon 66
  Number-average molecular weight: 14,000
  Terminal amino group concentration: 30 milliequivalent/kg
  Terminal carboxyl group concentration: 100 milliequivalent/kg (6) Polybutylene Terephthalate PBT: Duranex 2002 (Trade Name), Made by WinTech Polymer Ltd.

(7) Liquid Crystal Polymer
LCP: a liquid crystal polymer obtained by heating, melting and polycondensating p-hydroxybenzoic acid, 2-hydroxy-6-naphthoic acid and acetic anhydride under a nitrogen atmosphere.

(8) Hydrogenated Block Copolymer
HB-1: a hydrogenated block copolymer made by Krayton Polymers (product name: Krayton G-1651)
  Structure: polystyrene-hydrogenated polybutadiene-polystyrene
HB-2:
  Structure: polystyrene-hydrogenated polybutadiene-polystyrene
  Bonded styrene amount: 45%
  Number-average molecular weight: 86,000
  Molecular weight distribution: 1.07
  Bonded 1,2-vinyl amount of the polybutadiene before hydrogenation: 75%
HB-3:
  Structure: polystyrene-hydrogenated polybutadiene-polystyrene
  Number-average molecular weight: 176,000
  Bonded styrene amount: 33% by weight (9) Others
OT-1: a styrene-glycidyl methacrylate copolymer
  Containing 5% by weight of glycidyl methacrylate
  Weight-average molecular weight: 110,000
OT-2: an atactic homopolystyrene (685, made by Japan Polystyrene Inc.)
OT-3: a flame retardant (triphenyl phosphate, made by Daihachi Chemical Industry Co., Ltd., (product name: TPP))
OT-4: a styrene-2-propenyl-2-oxazoline copolymer
  Containing 5% by weight of 2-propenyl-2-oxazoline
  Weight-average molecular weight: 146,000
OT-5: maleic anhydride Thermoplastic Resins of (a) Component Thermoplastic resins of (a) component were manufactured using the raw materials described above. The detailed formulations are shown in Table 1.

a-1: PPS-1 a-2: PPS-2, PPE-1 and OT-1 were melted and kneaded in the formulation shown in Table 1 under the condition below to manufacture a PPS/PPE polymer alloy.

Extruder a twin screw extruder with vent ports (ZSK-40, made by Coperion Werner & Pfleiderer, Germany)

Set temperature: 300° C.

Screw rotation frequency: 300 rpm

All of PPS-2, PPE-1 and OT-1 were supplied to a first supply port, and melted and kneaded. The extruder was degassed under a reduced pressure from a first vent port, and further degassed under a reduced pressure also from a second vent port installed at a place near the outlet port of the extruder. A polymer alloy (a-2) was obtained as pellets.

a-3: a PPS/PPE polymer alloy was manufactured in the formulation shown in Table 1 as in a-2.

a-4: a PPS/PPE polymer alloy was manufactured in the formulation shown in Table 1 as in a-2.

a-5: a PPS/PPE polymer alloy was manufactured in the formulation shown in Table 1 as in a-2.

a-6: HIPS, PPE-2, HB-1 and OT-3 were melted and kneaded in the formulation shown in Table 1 under the condition below to manufacture a PPE/HIPS polymer alloy.

Extruder a twin screw extruder with vent ports (ZSK-40, made by Coperion Werner & Pfleiderer, Germany)

Set temperature: 270 to 290° C.

Screw rotation frequency: 250 rpm

A part of HIPS (8.8 parts by weight), PPE-2, HB-1 and OT-3 were supplied to a first supply port, and melted and kneaded. The extruder was degassed under a reduced pressure from a first vent port. The remainder of the HIPS (39 parts by weight) was supplied to a second supply port, and melted and kneaded. The extruder was degassed under a reduced pressure also from a second vent port. A polymer alloy (a-6) was obtained as pellets.

a-7: PP, PPE-3 and HB-2 were melted and kneaded in the formulation shown in Table 1 under the condition below to manufacture a PP/PPE polymer alloy.

Extruder a twin screw extruder with vent ports (ZSK-40, made by Coperion Werner & Pfleiderer, Germany)

Set temperature: 300° C.

Screw rotation frequency: 300 rpm

A part of PP (9.1 parts by weight), PPE-3 and HB-2 were supplied to a first supply port, and melted and kneaded. The extruder was degassed under a reduced pressure from a first vent port. The remainder of the PP (45.4 parts by weight) was supplied to a second supply port, and melted and kneaded. The extruder was degassed under a reduced pressure also from a second vent port. A polymer alloy (a-7) was obtained as pellets. The morphology of the polymer alloy had the polypropylene as a matrix and PPE particles dispersed. The dispersed PPE particle was covered with the hydrogenated block copolymer as the outer shell.

a-8: PA, PPE-3, HB-3 and OT-5 were melted and kneaded in the formulation shown in Table 1 under the condition below to manufacture a PA/PPE polymer alloy.

Extruder a twin screw extruder with vent ports (ZSK-40, made by Coperion Werner & Pfleiderer, Germany)

Set temperature: 300° C.

Screw rotation frequency: 300 rpm

PPE-3, HB-3 and OT-5 were supplied to a first supply port, and melted and kneaded. The extruder was degassed under a reduced pressure from a first vent port. PA was supplied to a second supply port, and melted and kneaded. The extruder was degassed under a reduced pressure also from a second vent port. A polymer alloy (a-8) was obtained as pellets. The morphology of the polymer alloy had the polyamide as a matrix and PPE particles dispersed. The hydrogenated block copolymer was dispersed in the dispersed PPE particle.

a-9: PE, PPE-3, HB-3 and OT-1 were melted and kneaded in the formulation shown in Table 1 under the condition below to manufacture a PBT/PPE polymer alloy.

Extruder a twin screw extruder with vent ports (ZSK-40, made by Coperion Werner & Pfleiderer, Germany)

Set temperature: 300° C.

Screw rotation frequency: 300 rpm

PE, PPE-3, HB-3 and OT-1 were supplied to a first supply port, and melted and kneaded. The extruder was degassed under a reduced pressure from a first vent port. The extruder was degassed under a reduced pressure also from a second vent port. A polymer alloy (a-9) was obtained as pellets. The morphology of the polymer alloy had the polybutylene terephthalate as a matrix and PPE particles dispersed. The hydrogenated block copolymer was dispersed in the dispersed PPE particle.

a-10: LCP a-11: LCP and PPE-4 were melted and kneaded in the formulation shown in Table 1 under the condition below to manufacture an LCP/PPE polymer alloy.

Extruder a twin screw extruder with vent ports (ZSK-40, made by Coperion Werner & Pfleiderer, Germany)

Set temperature: 310° C.

Screw rotation frequency: 300 rpm

LCP and PPE-4 were supplied to a first supply port, and melted and kneaded. The extruder was degassed under a reduced pressure from a first vent port. The extruder was degassed under a reduced pressure also from a second vent port. A polymer alloy (a-11) was obtained as pellets. The morphology of the polymer alloy had the LCP as a matrix and PPE particles dispersed.

The measuring conditions of the physical properties described above will be described below.

(i) Measuring Condition of Melt Viscosity

Measuring apparatus: a flow tester

L/D (L: die length/D: die diameter)=10/1

Measuring temperature: 300° C.

Load: 196 N

The measurement was conducted after a sample was kept under the condition above for 6 min.

(ii) Measuring Condition of Reduced Viscosity

Measuring solution: a chloroform solution in which a resin concentration was adjusted at 0.5 g/dl Measuring temperature: 30° C.

Nonconductive Fibrous Inorganic Fillers of (b) Component b-1: a glass fiber having an average fiber diameter of 13 μm and a cut length of 3 mm and surface-treated with an aminosilane-based coupling agent b-2: a glass fiber having an average fiber diameter of 6.5 μm and a cut length of 3 mm and surface-treated with an aminosilane-based coupling agent b-3: a glass fiber having an average fiber diameter of 6.5 μm and a cut length of 3 mm and surface-treated with an epoxysilane-based coupling agent b-4: a glass fiber having an average fiber diameter of 17 μm and surface-treated with an aminosilane-based coupling agent Binders for the (b-1) to (b-4) glass fibers were all epoxy resins.

Graphites of (c) Component
c-1: a flaky graphite having an average particle diameter of 2 μm
c-2: a flaky graphite having an average particle diameter of 5 μm
c-3: a flaky graphite having an average particle diameter of 10 μm
c-4: a flaky graphite having an average particle diameter of 20 μm
c-5: a flaky graphite having an average particle diameter of 30 μm
c-6: a flaky graphite having an average particle diameter of 50 μm
c-7: a flaky graphite having an average particle diameter of 60 μm
c-8: a flaky graphite having an average particle diameter of 130 μm
c-9: a flaky graphite having an average particle diameter of 20 μm and surface-treated with an aminosilane-based coupling agent (d) Other Components
d-1: a carbon fiber having an average fiber diameter of 6 μm and surface-treated with an epoxysilane-based coupling agent
d-2: a particulate graphite having an average particle diameter of 20 μm
d-3: acetylene black having an average particle diameter of 18 nm
d-4: conductive carbon black (Ketjen Black EC600JD, made by Ketjen Black International Co., Ltd.)

2. Evaluating Methods of Molded Products

Molded products molded by using resin compositions obtained from the (a) to (d) components were evaluated as follows.

(1) Surface Resistance Value and Surface Resistivity

The surface resistance value and the surface resistivity were measured using the double ring probe method according to JIS-K6900.

Measuring apparatus: an apparatus in which the two below were connected
Super-insulation tester (SM8213, made by DKK-TOA Corp.)
Electrode for flat plate SME8311, made by DKK-TOA Corp.
The diameter of the main electrode: 19.6 mm
The inner diameter of the ring-shaped electrode: 24.1 mm, the outer diameter thereof: 28.8 mm
Samples having an electric resistance of less than $2.5 \times 10^4 \Omega$ were measured using a digital ultrahigh resistance meter (R8340A, made by Advantest Corp.) in place of the super-insulation tester.
Samples: 5 plates of a platy injection molded product of 75 mm width, 75 mm wide and 3 mm thickness
The plates were allowed to stand at 23° C. and a relative humidity of 50% for not less than 24 hours
Measuring condition: voltage: 100 V, measuring time: 10 sec
The surface resistance value (Rs) was measured between the main electrode and the ring-shaped electrode. 5 plate samples were used, and each sample was measured at 4 points. The average of 20 points of the total was made as a measurement value.

A value obtained by multiplying the surface resistance value (Rs) by 30 of an electrode constant of the used electrode was made as the surface resistivity (Ω/sq.).

(2) Volume Resistance Value and Volume Resistivity

The volume resistance value and the volume resistivity were measured using the double ring probe method according to JIS-K6900.

Measuring apparatus: an apparatus in which the two below were connected
Super-insulation tester (SM8213, made by DKK-TOA Corp.)
Electrode for flat plate SME8311, made by DKK-TOA Corp.
The diameter of the main electrode: 19.6 mm
The inner diameter of the ring-shaped electrode: 24.1 mm, the outer diameter thereof 28.8 mm
Samples having an electric resistance of less than $2.5 \times 10^4 \Omega$ were measured using a digital ultrahigh resistance meter (R8340A, made by Advantest Corp.).
Samples: 5 plates of a platy injection molded product of 75 mm length, 75 mm width and 3 mm thickness
The plates were allowed to stand at 23° C. and a relative humidity of 50% for not less than 24 hours
Measuring condition: voltage: 100 V, measuring time: 10 sec
The ring-shaped electrode was used as a guard electrode.
The volume resistance value (Rv) in the thickness direction was measured between the main electrode and the metal of the counter electrode contacting with the surface of the opposite side of the molded product contacting with the main electrode. The average of 5 plate samples was made as a measurement value.

A value obtained by dividing a product of the volume resistance value (Rv) and 30 of an electrode constant of the used electrode by the thickness (mm) of the molded product was made as a volume resistivity (Ω·cm).

(3) Anisotropy (A) of Resistance Value

The anisotropy (A) of resistance value was determined by the following calculation expression.

$$(A)=(Rs)/(Rv)$$

(Rs: a surface resistance value measured by the measuring method described above, and Rv: a volume resistance value measured by the measuring method described above)

(4) Stability (S) of Resistance Value

The stability of resistance value was determined by the following expression.

$$(S)=(\log Rsmax)-(\log Rsmin)$$

(Rsmax: a maximum value of surface resistance values for 20 points measured in (1), and Rsmin: a minimum value of the surface resistance values for the 20 points measured in (1))

(5) Performance of Remolded Products Obtained by Reutilizing Molded Products

Flat plates for measurement of resistance value were again injection-molded by using reutilized pellets in 100%. The surface resistance value (Rs) and the volume resistance value (Rv) of the injection remolded products were measured by the methods described in (1) to (4) above; and the surface resistivity (Ω/sq.), the volume resistivity (Ω·cm), the anisotropy (A) of the resistance value and the stability (S) of the resistance value were determined.

3. Examples 1 to 24

Comparative Examples 1 to 13

(i) Manufacturing Method of Resin Compositions
Formulations: the (a) to (c) components, formulation amounts shown in Table 2 and Table 3
Extruder a twin screw extruder with vent ports (ZSK-40, made by Coperion Werner & Pfleiderer, Germany)
Set temperature: 250 to 310° C.
Screw rotation frequency: 300 rpm The thermoplastic resin as the (a) component was supplied to a first supply port while the (b) to (c) components were supplied to a second supply port; and the mixture was melted and kneaded to obtain a corresponding resin composition as pellets.

(ii) Injection Molding Method

Molding machine: a screw in-line type injection molding machine
Set temperature: 250 to 310° C.
Metal mold temperature: at PPS molding: 130° C.
at PA/PPE polymer alloy molding: 80° C.
at PP/PPE polymer alloy molding: 60° C.
at PPE resin composition molding: 80° C.
Samples: pellets described above (iii) Manufacturing Method of Reutilized Pellets
Raw materials: resins obtained by crushing the spool sections and runner sections generated in molding platy molded products described above
Extruder a single screw extruder with a vent port (SRV-L40, made by Nihon Yuki Co., Ltd.)
Set temperature: 250 to 310° C.
Screw rotation frequency: 80 rpm
Pelletization was performed under the condition described above to obtain reutilized pellets.

(iv) Injection Molding Method of Remolded Products
Raw materials: obtained reutilized pellets
The molding condition was the same as in (ii) described above.

The evaluation results of the obtained injection molded products are together shown in Tables 2 and 3.

TABLE 1

| | | Outline of components | Resin composition 1 | Resin composition 2 | Resin composition 3 | Other composition | Remarks |
|---|---|---|---|---|---|---|---|
| Formulation (parts by weight) | a-1 | PPS | PPS-1 | | | | PPS-1 alone was used |
| | a-2 | PPS/PPE alloy | PPS-2/68.6 | PPE-1/29.4 | | OT-1/2 | |
| | a-3 | PPS/PPE alloy | PPS-1/68.6 | PPE-1/29.4 | | OT-1/2 | |
| | a-4 | PPS/PPE alloy | PPS-2/70 | PPE-1/20 | | OT-2/10 | |
| | a-5 | PPS/PPE alloy | PPS-2/68.6 | PPE-1/29.4 | | OT-4/2 | |
| | a-6 | PPE/HIPS alloy | HIPS/47.8 | PPE-2/39.2 | HB-1/4.3 | OT-3/8.7 | |
| | a-7 | PP/PPE alloy | PP/54.5 | PPE-3/36.4 | HB-2/9.1 | | |
| | a-8 | PA66/PPE alloy | PA/54.3 | PPE-3/36.2 | HB-3/9.0 | OT-5/0.5 | |
| | a-9 | PBT/PPE alloy | PE/53.3 | PPE-3/35.6 | HB-3/8.9 | OT-1/2.2 | |
| | a-10 | LCP | LCP | | | | LCP alone was used |
| | a-11 | LCP/PPE alloy | LCP/60 | PPE-4/40 | | | |

TABLE 2

| | | Outline of components | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Formulation components (parts by weight) | a-1 | PPS | 100 | | | | | | 50 | |
| | a-2 | PPS/PPE alloy | | 100 | 100 | | | | 50 | 100 |
| | a-3 | PPS/PPE alloy | | | | 100 | | | | |
| | a-4 | PPS/PPE alloy | | | | | 100 | | | |
| | a-5 | PPS/PPE alloy | | | | | | 100 | | |
| | a-6 | PPE/HIPS alloy | | | | | | | | |
| | a-7 | PP/PPE alloy | | | | | | | | |
| | a-8 | PA66/PPE alloy | | | | | | | | |
| | a-9 | PBT/PPE alloy | | | | | | | | |
| | a-10 | LCP | | | | | | | | |
| | a-11 | LCP/PPE alloy | | | | | | | | |
| | b-1 | GF of 13 µm | | | | | | | | |
| | b-2 | GF of 6.5 µm | | 65 | | | | | | |
| | b-3 | GF of 6.5 µm | 35 | | 35 | 35 | 35 | 35 | 35 | 35 |
| | b-4 | GF of 17 µm | | | | | | | | |
| | c-1 | Graphite of 2 µm | | | | | | | | |
| | c-2 | Graphite of 5 µm | 25 | 17 | 25 | 25 | 25 | 25 | 25 | 25 |
| | c-3 | Graphite of 10 µm | | | | | | | | |
| | c-4 | Graphite of 20 µm | | 14 | | | | | | |
| | c-5 | Graphite of 30 µm | 10 | | 10 | 10 | 10 | 10 | 10 | |
| | c-6 | Graphite of 50 µm | | | | | | | | 5 |
| | c-7 | Graphite of 60 µm | | | | | | | | |
| | c-8 | Graphite of 130 µm | | | | | | | | |
| | c-9 | Graphite of 20 µm | | | | | | | | |
| | d-1 | Carbon fiber of 6 µm | | | | | | | | |
| | d-2 | Particulate graphite of 20 µm | | | | | | | | |
| | d-3 | Acetylene black | | | | | | | | |
| | d-4 | Ketjen black | | | | | | | | |
| Performance | | Surface resistance value (Rs): Ω | $2.0 \times 10^5$ | $2.5 \times 10^5$ | $3.8 \times 10^5$ | $3.5 \times 10^5$ | $3.1 \times 10^5$ | $2.6 \times 10^5$ | $2.8 \times 10^5$ | $8.1 \times 10^5$ |
| | | Surface resistivity: Ω/sq. | $6.0 \times 10^6$ | $7.5 \times 10^6$ | $1.1 \times 10^7$ | $1.1 \times 10^7$ | $9.3 \times 10^6$ | $7.8 \times 10^6$ | $8.4 \times 10^6$ | $2.4 \times 10^7$ |
| | | Volume resistance value (Rv): Ω | $2.3 \times 10^5$ | $4.3 \times 10^5$ | $4.2 \times 10^5$ | $3.6 \times 10^5$ | $3.1 \times 10^5$ | $2.8 \times 10^5$ | $3.0 \times 10^5$ | $7.8 \times 10^5$ |
| | | Volume resistivity: Ω · cm | $2.3 \times 10^6$ | $4.3 \times 10^6$ | $4.2 \times 10^6$ | $3.6 \times 10^6$ | $3.1 \times 10^6$ | $2.8 \times 10^6$ | $3.0 \times 10^6$ | $7.8 \times 10^6$ |
| | | Anisotropy (A) of resistance value | 0.87 | 0.58 | 0.90 | 0.97 | 1.00 | 0.93 | 0.93 | 1.04 |
| | | Stability (S) of resistance value | 1.2 | 1.5 | 1.3 | 1.6 | 1.7 | 2.2 | 1.8 | 1.5 |

TABLE 2-continued

| Performance of re-molded product | Surface resistance value (Rs): Ω | $3.1 \times 10^5$ | $2.8 \times 10^5$ | $4.4 \times 10^5$ | $4.0 \times 10^5$ | $3.8 \times 10^5$ | $3.1 \times 10^5$ | $3.3 \times 10^5$ | $9.0 \times 10^5$ |
|---|---|---|---|---|---|---|---|---|---|
| | Surface resistivity: Ω/sq. | $9.3 \times 10^6$ | $8.4 \times 10^6$ | $1.3 \times 10^7$ | $1.2 \times 10^7$ | $1.1 \times 10^7$ | $9.3 \times 10^6$ | $9.9 \times 10^6$ | $2.7 \times 10^7$ |
| | Volume resistance value (Rv): Ω | $2.8 \times 10^5$ | $4.4 \times 10^5$ | $4.5 \times 10^5$ | $4.1 \times 10^5$ | $3.4 \times 10^5$ | $2.8 \times 10^5$ | $2.8 \times 10^5$ | $9.4 \times 10^5$ |
| | Volume resistivity: Ω·cm | $2.8 \times 10^6$ | $4.4 \times 10^6$ | $4.5 \times 10^6$ | $4.1 \times 10^6$ | $3.4 \times 10^6$ | $2.8 \times 10^6$ | $2.8 \times 10^6$ | $9.4 \times 10^6$ |
| | Anisotropy (A) of resistance value | 1.11 | 0.64 | 0.98 | 0.98 | 1.12 | 1.11 | 1.18 | 0.96 |
| | Stability (S) of resistance value | 1.4 | 1.6 | 1.5 | 1.8 | 2.0 | 2.4 | 2.2 | 1.8 |

| | | Outline of components | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Formulation components (parts by weight) | a-1 | PPS | | | | | | | | |
| | a-2 | PPS/PPE alloy | 100 | 100 | 100 | 100 | 100 | 100 | 100 | 100 |
| | a-3 | PPS/PPE alloy | | | | | | | | |
| | a-4 | PPS/PPE alloy | | | | | | | | |
| | a-5 | PPS/PPE alloy | | | | | | | | |
| | a-6 | PPE/HIPS alloy | | | | | | | | |
| | a-7 | PP/PPE alloy | | | | | | | | |
| | a-8 | PA66/PPE alloy | | | | | | | | |
| | a-9 | PBT/PPE alloy | | | | | | | | |
| | a-10 | LCP | | | | | | | | |
| | a-11 | LCP/PPE alloy | | | | | | | | |
| | b-1 | GF of 13 μm | | | | | | | | |
| | b-2 | GF of 6.5 μm | | | | | | | | |
| | b-3 | GF of 6.5 μm | 35 | 35 | 65 | 15 | 35 | 35 | 35 | 35 |
| | b-4 | GF of 17 μm | | | | | | | | |
| | c-1 | Graphite of 2 μm | 30 | | | | | | 50 | |
| | c-2 | Graphite of 5 μm | | | 13 | 25 | 10 | | | 25 |
| | c-3 | Graphite of 10 μm | | 15 | | | | 15 | | 10 |
| | c-4 | Graphite of 20 μm | 15 | 15 | | | | | 5 | |
| | c-5 | Graphite of 30 μm | | | 5 | 10 | 5 | | | |
| | c-6 | Graphite of 50 μm | | | | | | | | |
| | c-7 | Graphite of 60 μm | | | | | | | | |
| | c-8 | Graphite of 130 μm | | | | | | | | |
| | c-9 | Graphite of 20 μm | | | | | | | | |
| | d-1 | Carbon fiber of 6 μm | | | | | | | | |
| | d-2 | Particulate graphite of 20 μm | | | | | | 15 | | |
| | d-3 | Acetylene black | | | | | | | | |
| | d-4 | Ketjen black | | | | | | | | |
| Performance | Surface resistance value (Rs): Ω | | $3.1 \times 10^6$ | $4.6 \times 10^5$ | $6.6 \times 10^7$ | $8.1 \times 10^8$ | $6.9 \times 10^{10}$ | $7.6 \times 10^8$ | $5.3 \times 10^8$ | $8.8 \times 10^8$ |
| | Surface resistivity: Ω/sq. | | $9.3 \times 10^7$ | $1.4 \times 10^7$ | $2.0 \times 10^9$ | $2.4 \times 10^{10}$ | $2.1 \times 10^{12}$ | $2.3 \times 10^{10}$ | $1.6 \times 10^{10}$ | $2.6 \times 10^{10}$ |
| | Volume resistance value (Rv): Ω | | $3.0 \times 10^6$ | $3.9 \times 10^5$ | $6.7 \times 10^7$ | $7.6 \times 10^8$ | $6.0 \times 10^{10}$ | $7.6 \times 10^8$ | $4.4 \times 10^8$ | $5.7 \times 10^8$ |
| | Volume resistivity: Ω·cm | | $3.0 \times 10^7$ | $3.9 \times 10^6$ | $6.7 \times 10^8$ | $7.6 \times 10^9$ | $6.0 \times 10^{11}$ | $7.6 \times 10^9$ | $4.4 \times 10^9$ | $5.7 \times 10^9$ |
| | Anisotropy (A) of resistance value | | 1.03 | 1.18 | 0.99 | 1.07 | 1.15 | 1.00 | 1.20 | 1.54 |
| | Stability (S) of resistance value | | 2.6 | 0.8 | 1.1 | 2.4 | 1.7 | 1.6 | 1.6 | 1.9 |
| Performance of re-molded product | Surface resistance value (Rs): Ω | | $3.9 \times 10^6$ | $5.1 \times 10^5$ | $7.1 \times 10^7$ | $8.7 \times 10^8$ | $7.4 \times 10^{10}$ | $7.8 \times 10^8$ | $5.5 \times 10^8$ | $1.0 \times 10^9$ |
| | Surface resistivity: Ω/sq. | | $1.2 \times 10^8$ | $1.5 \times 10^7$ | $2.1 \times 10^9$ | $2.6 \times 10^{10}$ | $2.2 \times 10^{12}$ | $2.3 \times 10^{10}$ | $1.7 \times 10^{10}$ | $3.0 \times 10^{10}$ |
| | Volume resistance value (Rv): Ω | | $4.1 \times 10^6$ | $4.8 \times 10^5$ | $6.9 \times 10^7$ | $8.5 \times 10^8$ | $7.8 \times 10^{10}$ | $8.0 \times 10^8$ | $5.8 \times 10^8$ | $6.2 \times 10^8$ |
| | Volume resistivity: Ω·cm | | $4.1 \times 10^7$ | $4.8 \times 10^6$ | $6.9 \times 10^8$ | $8.5 \times 10^9$ | $7.8 \times 10^{11}$ | $8.0 \times 10^9$ | $5.8 \times 10^9$ | $6.2 \times 10^9$ |
| | Anisotropy (A) of resistance value | | 0.95 | 1.06 | 1.03 | 0.98 | 0.95 | 0.98 | 0.95 | 1.61 |
| | Stability (S) of resistance value | | 3.1 | 1.1 | 1.3 | 2.8 | 2.6 | 2.1 | 2.4 | 2.7 |

| | | Outline of components | Ex. 17 | Ex. 18 | Ex. 19 | Ex. 20 | Ex. 21 | Ex. 22 | Ex. 23 | Ex. 24 |
|---|---|---|---|---|---|---|---|---|---|---|
| Formulation components (parts by weight) | a-1 | PPS | | | | | | | | |
| | a-2 | PPS/PPE alloy | 100 | 100 | | | | | | |
| | a-3 | PPS/PPE alloy | | | | | | | | |
| | a-4 | PPS/PPE alloy | | | | | | | | |
| | a-5 | PPS/PPE alloy | | | | | | | | |
| | a-6 | PPE/HIPS alloy | | | 100 | | | | | |
| | a-7 | PP/PPE alloy | | | | 100 | | | | |
| | a-8 | PA66/PPE alloy | | | | | 100 | | | |
| | a-9 | PBT/PPE alloy | | | | | | 100 | | |
| | a-10 | LCP | | | | | | | 100 | |
| | a-11 | LCP/PPE alloy | | | | | | | | 100 |
| | b-1 | GF of 13 μm | | | | 25 | 20 | | | |
| | b-2 | GF of 6.5 μm | | | | | | | | |
| | b-3 | GF of 6.5 μm | 35 | 35 | | | | 30 | 55 | 65 | 65 |
| | b-4 | GF of 17 μm | | | | | | | | |
| | c-1 | Graphite of 2 μm | | 25 | | | 30 | | | |
| | c-2 | Graphite of 5 μm | | | | | | 22 | 15 | 20 | 20 |
| | c-3 | Graphite of 10 μm | | | 10 | 15 | | | | |
| | c-4 | Graphite of 20 μm | | | | 10 | 14 | 8 | | |
| | c-5 | Graphite of 30 μm | | | 25 | | | | | |
| | c-6 | Graphite of 50 μm | 10 | | | | | | | 8 |
| | c-7 | Graphite of 60 μm | | | | | | | | |
| | c-8 | Graphite of 130 μm | | | | | | | | |
| | c-9 | Graphite of 20 μm | | | | | | | 5 | 13 |

TABLE 2-continued

|  |  |  |  |  |  |  |  |  |  |
|---|---|---|---|---|---|---|---|---|---|
|  | d-1 | Carbon fiber of 6 μm |  |  |  |  |  |  |  |
|  | d-2 | Particulate graphite of 20 μm |  |  |  |  |  |  |  |
|  | d-3 | Acetylene black |  |  |  |  |  |  |  |
|  | d-4 | Ketjen black |  |  |  |  |  |  |  |
| Performance | Surface resistance value (Rs): Ω | | $8.7 \times 10^7$ | $5.5 \times 10^4$ | $7.1 \times 10^6$ | $1.4 \times 10^7$ | $1.3 \times 10^5$ | $3.6 \times 10^9$ | $1.1 \times 10^5$ | $1.2 \times 10^5$ |
|  | Surface resistivity: Ω/sq. | | $2.6 \times 10^9$ | $1.7 \times 10^6$ | $2.1 \times 10^8$ | $4.2 \times 10^8$ | $3.9 \times 10^6$ | $1.1 \times 10^{11}$ | $3.3 \times 10^6$ | $3.6 \times 10^6$ |
|  | Volume resistance value (Rv): Ω | | $4.8 \times 10^7$ | $2.9 \times 10^4$ | $1.6 \times 10^7$ | $2.3 \times 10^7$ | $1.7 \times 10^5$ | $5.7 \times 10^9$ | $1.4 \times 10^5$ | $1.6 \times 10^5$ |
|  | Volume resistivity: Ω·cm | | $4.8 \times 10^8$ | $2.9 \times 10^5$ | $1.6 \times 10^8$ | $2.3 \times 10^8$ | $1.7 \times 10^6$ | $5.7 \times 10^{10}$ | $1.4 \times 10^6$ | $1.6 \times 10^6$ |
|  | Anisotropy (A) of resistance value | | 1.81 | 1.90 | 0.44 | 0.61 | 0.76 | 0.63 | 0.79 | 0.75 |
|  | Stability (S) of resistance value | | 1.7 | 1.0 | 1.4 | 1.3 | 1.7 | 1.4 | 0.9 | 0.7 |
| Performance of re-molded product | Surface resistance value (Rs): Ω | | $1.3 \times 10^8$ | $9.2 \times 10^4$ | $7.8 \times 10^6$ | $1.8 \times 10^7$ | $1.1 \times 10^5$ | $4.8 \times 10^9$ | $1.8 \times 10^5$ | $2.9 \times 10^5$ |
|  | Surface resistivity: Ω/sq. | | $3.9 \times 10^9$ | $2.8 \times 10^6$ | $2.3 \times 10^8$ | $5.4 \times 10^8$ | $3.3 \times 10^6$ | $1.4 \times 10^{11}$ | $5.4 \times 10^6$ | $8.7 \times 10^6$ |
|  | Volume resistance value (Rv): Ω | | $6.9 \times 10^7$ | $4.7 \times 10^4$ | $1.5 \times 10^7$ | $2.9 \times 10^7$ | $1.4 \times 10^5$ | $5.1 \times 10^9$ | $2.1 \times 10^5$ | $3.7 \times 10^5$ |
|  | Volume resistivity: Ω·cm | | $6.9 \times 10^8$ | $4.7 \times 10^5$ | $1.5 \times 10^8$ | $2.9 \times 10^8$ | $1.4 \times 10^5$ | $5.1 \times 10^{10}$ | $2.1 \times 10^6$ | $3.7 \times 10^6$ |
|  | Anisotropy (A) of resistance value | | 1.88 | 1.96 | 0.52 | 0:62 | 0.79 | 0.94 | 0.86 | 0.78 |
|  | Stability (S) of resistance value | | 2.6 | 1.3 | 1.9 | 2.0 | 2.7 | 1.8 | 1.5 | 1.0 |

TABLE 3

|  |  | Outline of components | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Formulation components (parts by weight) | a-1 | PPS | 100 | | | | | | |
|  | a-2 | PPS/PPE alloy | | 100 | 100 | 100 | 100 | 100 | 100 |
|  | a-3 | PPS/PPE alloy | | | | | | | |
|  | a-4 | PPS/PPE alloy | | | | | | | |
|  | a-5 | PPS/PPE alloy | | | | | | | |
|  | a-6 | PPE/HIPS alloy | | | | | | | |
|  | a-7 | PP/PPE alloy | | | | | | | |
|  | a-8 | PA66/PPE alloy | | | | | | | |
|  | a-9 | PBT/PPE alloy | | | | | | | |
|  | a-10 | LCP | | | | | | | |
|  | a-11 | LCP/PPE alloy | | | | | | | |
|  | b-1 | GF of 13 μm | | | | | | | |
|  | b-2 | GF of 6.5 μm | | | | | | | |
|  | b-3 | GF of 6.5 μm | 35 | 35 | 35 | | 35 | 35 | 35 |
|  | b-4 | GF of 17 μm | | | | | | | |
|  | c-1 | Graphite of 2 μm | | | | | | | |
|  | c-2 | Graphite of 5 μm | 35 | | | 25 | | | |
|  | c-3 | Graphite of 10 μm | | | | | | | |
|  | c-4 | Graphite of 20 μm | | | 35 | | | | |
|  | c-5 | Graphite of 30 μm | | | | | 10 | | |
|  | c-6 | Graphite of 50 μm | | | | | | | 25 |
|  | c-7 | Graphite of 60 μm | | | | | | | |
|  | c-8 | Graphite of 130 μm | | | | | | | 10 |
|  | c-9 | Graphite of 20 μm | | | | | | | |
|  | d-1 | Carbon fiber of 6 μm | | | | 15 | 5 | | |
|  | d-2 | Particulate graphite of 20 μm | | | | | | | |
|  | d-3 | Acetylene black | | | | | | 35 | |
|  | d-4 | Ketjen black | | | | | | | 4 |
| Performance | Surface resistance value (Rs): Ω | | $1.7 \times 10^6$ | $8.2 \times 10^4$ | $4.2 \times 10^2$ | $5.4 \times 10^2$ | *1 | $3.6 \times 10^4$ | $5.6 \times 10^2$ |
|  | Surface resistivity: Ω/sq. | | $5.1 \times 10^7$ | $2.5 \times 10^6$ | $1.3 \times 10^4$ | $1.6 \times 10^4$ | — | $1.1 \times 10^6$ | $1.7 \times 10^4$ |
|  | Volume resistance value (Rv): Ω | | $8.9 \times 10^5$ | $4.4 \times 10^4$ | $1.4 \times 10^2$ | $3.1 \times 10^2$ | *1 | $6.3 \times 10^3$ | $2.8 \times 10^2$ |
|  | Volume resistivity: Ω·cm | | $8.9 \times 10^6$ | $4.4 \times 10^5$ | $1.4 \times 10^3$ | $3.1 \times 10^3$ | — | $6.3 \times 10^4$ | $2.8 \times 10^3$ |
|  | Anisotropy (A) of resistance value | | 1.91 | 1.86 | 3.00 | 1.74 | — | 5.71 | 2.00 |
|  | Stability (S) of resistance value | | 3.4 | 5.1 | 6.8 | 2.1 | — | 3.3 | 3.8 |
| Performance of re-molded product | Surface resistance value (Rs): Ω | | $7.9 \times 10^7$ | $4.3 \times 10^5$ | $7.9 \times 10^2$ | $3.9 \times 10^2$ | *1 | $3.3 \times 10^4$ | $6.7 \times 10^3$ |
|  | Surface resistivity: Ω/sq. | | $2.4 \times 10^9$ | $1.3 \times 10^7$ | $2.4 \times 10^4$ | $1.2 \times 10^4$ | — | $9.9 \times 10^5$ | $2.0 \times 10^5$ |
|  | Volume resistance value (Rv): Ω | | $3.6 \times 10^7$ | $2.2 \times 10^5$ | $3.1 \times 10^2$ | $2.3 \times 10^2$ | *1 | $5.9 \times 10^3$ | $2.9 \times 10^3$ |
|  | Volume resistivity: Ω·cm | | $3.6 \times 10^8$ | $2.2 \times 10^6$ | $3.1 \times 10^3$ | $2.3 \times 10^3$ | — | $5.9 \times 10^4$ | $2.9 \times 10^4$ |
|  | Anisotropy (A) of resistance value | | 2.19 | 1.95 | 2.55 | 1.70 | — | 5.59 | 2.31 |
|  | Stability (S) of resistance value | | 3.8 | 5.5 | 6.1 | 2.4 | — | 3.9 | 4.3 |

|  |  | Outline of components | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|---|
| Formulation components (parts by weight) | a-1 | PPS | | | | | | |
|  | a-2 | PPS/PPE alloy | | | | | | |
|  | a-3 | PPS/PPE alloy | | | | | | |
|  | a-4 | PPS/PPE alloy | | | | | | |
|  | a-5 | PPS/PPE alloy | | | | | | |
|  | a-6 | PPE/HIPS alloy | 100 | | | | | |
|  | a-7 | PP/PPE alloy | | 100 | | | | |
|  | a-8 | PA66/PPE alloy | | | 100 | | | |
|  | a-9 | PBT/PPE alloy | | | | 100 | | |
|  | a-10 | LCP | | | | | 100 | |
|  | a-11 | LCP/PPE alloy | | | | | | 100 |

TABLE 3-continued

|  |  |  |  |  |  |  |  |
|---|---|---|---|---|---|---|---|
|  | b-1 GF of 13 μm |  | 20 |  |  |  |  |
|  | b-2 GF of 6.5 μm |  |  |  |  |  |  |
|  | b-3 GF of 6.5 μm |  |  | 30 | 55 | 65 | 10 |
|  | b-4 GF of 17 μm | 25 |  |  |  |  |  |
|  | c-1 Graphite of 2 μm |  | 30 |  | 5 |  |  |
|  | c-2 Graphite of 5 μm |  |  | 22 | 15 | 20 | 20 |
|  | c-3 Graphite of 10 μm | 15 |  |  |  |  |  |
|  | c-4 Graphite of 20 μm | 10 |  |  |  |  |  |
|  | c-5 Graphite of 30 μm |  |  |  |  |  |  |
|  | c-6 Graphite of 50 μm |  |  |  |  |  |  |
|  | c-7 Graphite of 60 μm |  | 14 |  |  | 8 |  |
|  | c-8 Graphite of 130 μm |  |  | 8 |  |  |  |
|  | c-9 Graphite of 20 μm |  |  |  |  |  | 13 |
|  | d-1 Carbon fiber of 6 μm |  |  |  |  |  |  |
|  | d-2 Particulate graphite of 20 μm |  |  |  |  |  |  |
|  | d-3 Acetylene black |  |  |  |  |  |  |
|  | d-4 Ketjen black |  |  |  |  |  |  |
| Perfor- | Surface resistance value (Rs): Ω | $2.6 \times 10^7$ | $3.1 \times 10^3$ | $4.4 \times 10^3$ | $2.8 \times 10^{11}$ | $8.3 \times 10^3$ | $5.3 \times 10^8$ |
| mance | Surface resistivity: Ω/sq. | $7.8 \times 10^8$ | $9.3 \times 10^4$ | $1.3 \times 10^5$ | $8.4 \times 10^{12}$ | $2.5 \times 10^5$ | $1.6 \times 10^{10}$ |
|  | Volume resistance value (Rv): Ω | $1.2 \times 10^7$ | $1.5 \times 10^3$ | $2.3 \times 10^3$ | $1.5 \times 10^{11}$ | $3.9 \times 10^3$ | $2.6 \times 10^8$ |
|  | Volume resistivity: Ω · cm | $1.2 \times 10^8$ | $1.5 \times 10^4$ | $2.3 \times 10^4$ | $1.5 \times 10^{12}$ | $3.9 \times 10^4$ | $2.6 \times 10^9$ |
|  | Anisotropy (A) of resistance value | 2.17 | 2.07 | 1.91 | 1.87 | 2.13 | 2.04 |
|  | Stability (S) of resistance value | 5.6 | 3.1 | 3.7 | 4.3 | 3.7 | 4.6 |
| Perfor- | Surface resistance value (Rs): Ω | $1.1 \times 10^8$ | $5.2 \times 10^4$ | $3.5 \times 10^4$ | $1.7 \times 10^{12}$ | $7.3 \times 10^4$ | $3.9 \times 10^9$ |
| mance | Surface resistivity: Ω/sq. | $3.3 \times 10^9$ | $1.6 \times 10^6$ | $1.1 \times 10^6$ | $5.1 \times 10^{13}$ | $2.2 \times 10^6$ | $1.2 \times 10^{11}$ |
| of re- | Volume resistance value (Rv): Ω | $4.8 \times 10^7$ | $2.3 \times 10^4$ | $1.8 \times 10^4$ | $8.8 \times 10^{11}$ | $3.6 \times 10^4$ | $1.8 \times 10^9$ |
| molded | Volume resistivity: Ω · cm | $4.8 \times 10^8$ | $2.3 \times 10^5$ | $1.8 \times 10^5$ | $8.8 \times 10^{12}$ | $3.6 \times 10^5$ | $1.8 \times 10^{10}$ |
| product | Anisotropy (A) of resistance value | 2.29 | 2.26 | 1.94 | 1.93 | 2.03 | 2.17 |
|  | Stability (S) of resistance value | 6.2 | 3.7 | 3.9 | 5.2 | 4.5 | 4.9 |

*1: Samples could not be fabricated due to insufficient fluidity, so, the measurement was impossible.

Industrial Applicability

Molded products molded with the resin composition according to the present invention have a stable surface resistance value and volume resistance value which are actually measured, both of which are equivalent to each other, in the antistatic region having a surface resistivity in the range of $1 \times 10^9$ to $1 \times 10^{14}$ Ω/sq. and the static dissipative region having a surface resistivity in the range of $1 \times 10^5$ to $1 \times 10^9$ Ω/sq. Further, remolded products obtained utilizing the molded products also exhibit a similar noninsulating property. Therefore, the resin composition can be utilized as conductive parts in the antistatic region and the static dissipative region in electric and electronic devices, automobile devices, chemical devices and optical devices. They can be utilized, for example, as paper feeding roller bearings of electrostatic copying machines, paper feeding/discharging chassis of printing machines, gasoline and/or alcohol tank peripheral parts, IC protecting containers (containing IC trays), exterior parts for vehicles, coil encapsulating parts, motor sealing parts and transistor packaging parts.

The invention claimed is:

1. A resin composition comprising:
   100 parts by weight of (a) a thermoplastic resin;
   20 to 80 parts by weight of (b) a nonconductive fibrous inorganic filler having an average fiber diameter of not more than 15 μm; and
   10 to 70 parts by weight of the total of at least two kinds of (c) graphite having an average particle diameter of 1 μm to 50 μm wherein each kind thereof has a different particle diameter; wherein the shape of the graphite is scaly or flaky;
   wherein the two kinds of the (c) graphite are (c1) a graphite having an average particle diameter of from 15 μm to 50 μm and (c2) a graphite having an average particle diameter of from 1 μm to 10 μm;
   wherein (an average particle diameter of the (c1) component)/(an average particle diameter of the (c2) component) is from 3 to 10;
   wherein (a formulation amount of the (c1) component)/(a formulation amount of the (c2) component) is from 0.1 to 1.0;
   wherein a total amount of the component (b) and the component (c) is 30 parts by weight or more and 98 parts by weight or less;
   wherein component (a) is a polymer alloy comprising a matrix phase which comprises a member selected from the group consisting of polyamide, polybutylene terephthalate, and liquid crystal polymer; and a dispersed phase which comprises polyphenylene ether; and
   wherein both the (c1) component and the (c2) component are in the matrix phase.

2. The resin composition according to claim 1, wherein the (a) component is a polymer alloy of polyphenylene ether and a liquid crystal polymer.

3. A resin composition obtained by melt-kneading 100 parts by weight of (a) a thermoplastic resin; 20 parts by weight to 80 parts by weight of (b) a nonconductive fibrous inorganic filler having an average fiber diameter of not more than 15 μm; and 10 parts by weight to 70 parts by weight of the total of two kinds of (c) graphite having an average particle diameter of from 1 μm to 50 μm wherein each kind thereof has a different particle diameter;
   wherein the shape of the graphite is scaly or flaky;
   wherein the two kinds of the (c) graphite are (c1) a graphite having an average particle diameter of from 15 μm to 50 μm and (c2) a graphite having an average particle diameter of from 1 μm to 10 μm;
   wherein (an average particle diameter of the (c1) component)/(an average particle diameter of the (c2) component) is from 3 to 10;
   wherein (a formulation amount of the (c1) component)/(a formulation amount of the (c2) component) is from 0.1 to 1.0;
   wherein a total amount of the component (b) and the component (c) is 30 parts by weight or more and 98 parts by weight or less;

wherein component (a) is a polymer alloy comprising a matrix phase which comprises a member selected from the group consisting of polyamide, polybutylene terephthalate, and liquid crystal polymer; and a dispersed phase which comprises polyphenylene ether; and wherein both the (c1) component and the (c2) component are in the matrix phase.

4. A resin composition comprising:

100 parts by weight of (a) a thermoplastic resin;

20 to 80 parts by weight of (b) a nonconductive fibrous inorganic filler having an average fiber diameter of not more than 15 μm;

10 to 70 parts by weight of a total of at least two kinds of (c) graphite having an average particle diameter of 1 μm to 50 μm wherein each kind thereof has a different particle diameter; and at least one difference in average particle diameter between the at least two kinds thereof is not less than 5 μm;

wherein a total amount of the component (b) and the component (c) is 30 parts by weight or more and 98 parts by weight or less;

wherein component (a) is a polymer alloy comprising a matrix phase which comprises a member selected from the group consisting of polyamide, polybutylene terephthalate, and liquid crystal polymer; and a dispersed phase which comprises polyphenylene ether; and wherein both the (c1) component and the (c2) component are in the matrix phase.

5. The resin composition according to claim 4, wherein the (a) component comprises an alloy of a crystalline resin and a noncrystalline resin.

6. The resin composition according to claim 5, comprising a crystalline resin selected from the group consisting of a polyamide, a liquid crystal polymer, and a polybutylene terephthalate; and a noncrystalline resin, which is a polyphenylene ether.

7. The resin composition according to claim 4, wherein the nonconductive fibrous inorganic filler of the (b) component is at least one species selected from the group consisting of a glass fiber, an alumina fiber, a ceramic fiber, a gypsum fiber, a potassium titanate whisker, a magnesium sulfate whisker, a zinc oxide whisker, a calcium carbonate whisker, and a fibrous wollastonite.

8. The resin composition according to claim 7, wherein the nonconductive fibrous inorganic filler of the (b) component is a glass fiber.

9. The resin composition according to claim 8, wherein the nonconductive fibrous inorganic filler of the (b) component is a glass fiber having an average fiber diameter of from 4 μm to 10 μm.

10. The resin composition according to claim 4, wherein the resin composition has a surface resistivity of from $1\times10^5$ Ω/sq. to $1\times10^{14}$ Ω/sq.

11. The resin composition according to claim 4, wherein the resin composition has an anisotropy of a resistance value of from 0.3 to 1.5.

12. A molded product molded using the resin composition according to claim 3.

13. A remolded product obtained by reutilizing a molded product molded using the resin composition according to claim 12.

14. A resin composition comprising:

100 parts by weight of (a) a thermoplastic resin;

20 to 80 parts by weight of (b) a nonconductive fibrous inorganic filler having an average fiber diameter of not more than 15 μm;

10 to 70 parts by weight of a total of at least two kinds of (c) graphite having an average particle diameter of 1 μm to 50 μm wherein each kind thereof has a different particle diameter;

and at least one difference in average particle diameter between the at least two kinds thereof is not less than 5 μm; and wherein a total amount of the component (b) and the component (c) is 30 parts by weight or more and 93 parts by weight or less.

* * * * *

UNITED STATES PATENT AND TRADEMARK OFFICE
CERTIFICATE OF CORRECTION

| | |
|---|---|
| PATENT NO. | : 8,487,035 B2 |
| APPLICATION NO. | : 12/294287 |
| DATED | : July 16, 2013 |
| INVENTOR(S) | : Y. Akiyama et al. |

It is certified that error appears in the above-identified patent and that said Letters Patent is hereby corrected as shown below:

On Title Page, References Cited, U.S. Patent Documents, please change "550,471 A" to --5,500,471--.

In the Claims

At column 25, line 27, (claim 4, line 20) of the printed patent, please delete "both the (c1) component and the (c2) component".

At column 25, line 27, (claim 4, line 20) of the printed patent, please insert --the at least two kinds of (c) graphite--.

Signed and Sealed this
Twenty-eighth Day of January, 2014

Michelle K. Lee
*Deputy Director of the United States Patent and Trademark Office*